United States Patent
Kawai et al.

(10) Patent No.: US 6,471,749 B1
(45) Date of Patent: Oct. 29, 2002

(54) GAS PURIFICATION METHOD

(75) Inventors: Masato Kawai; Morimitsu Nakamura; Shigeo Tooyama, all of Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 09/566,820

(22) Filed: May 8, 2000

(30) Foreign Application Priority Data

May 11, 1999 (JP) .......................... 11-129803

(51) Int. Cl.$^7$ ..................... B01D 53/04; B01D 53/26
(52) U.S. Cl. ................. 95/99; 95/106; 95/120; 95/123; 95/139
(58) Field of Search ................ 95/99, 100, 106, 95/117–123, 139

(56) References Cited

U.S. PATENT DOCUMENTS

| | | | | |
|---|---|---|---|---|
| 3,140,931 A | * | 7/1964 | McRobbie | 95/106 |
| 3,594,983 A | * | 7/1971 | Yearout | 95/139 X |
| 3,738,084 A | * | 6/1973 | Simonet et al. | 95/139 X |
| 3,885,927 A | * | 5/1975 | Sherman et al. | 95/139 |
| 4,233,038 A | * | 11/1980 | Tao | 95/139 X |
| 4,249,915 A | * | 2/1981 | Sircar et al. | 95/99 |
| 4,329,158 A | * | 5/1982 | Sircar | 95/99 X |
| 4,472,178 A | * | 9/1984 | Kumar et al. | 95/99 |
| 4,557,735 A | * | 12/1985 | Pike | 95/99 |
| 4,711,645 A | * | 12/1987 | Kumar | 95/139 X |
| 4,986,835 A | * | 1/1991 | Uno et al. | 95/99 |
| 5,137,548 A | * | 8/1992 | Grenier et al. | 95/123 X |
| 5,156,657 A | * | 10/1992 | Jain et al. | 95/139 X |
| 5,202,096 A | * | 4/1993 | Jain | 95/123 X |
| 5,447,558 A | * | 9/1995 | Acharya | 95/139 X |
| 5,560,763 A | * | 10/1996 | Kumar | 95/106 X |
| 5,571,309 A | * | 11/1996 | Kumar | 95/139 X |
| 5,614,000 A | * | 3/1997 | Kalbassi et al. | 95/106 X |
| 5,647,891 A | * | 7/1997 | Blizzard et al. | 95/99 |
| 5,728,198 A | * | 3/1998 | Acharya et al. | 95/123 X |
| 5,769,928 A | * | 6/1998 | Leavitt | 95/139 X |
| 5,779,767 A | * | 7/1998 | Golden et al. | 95/106 X |
| 5,846,295 A | * | 12/1998 | Kalbassi et al. | 95/106 X |
| 5,855,650 A | * | 1/1999 | Kalbassi et al. | 95/106 |
| 5,906,675 A | * | 5/1999 | Jain et al. | 95/99 |
| 5,914,455 A | * | 6/1999 | Jain et al. | 95/106 X |
| 6,106,593 A | * | 8/2000 | Golden et al. | 95/120 |

FOREIGN PATENT DOCUMENTS

| | | | | |
|---|---|---|---|---|
| GB | 2181666 | * | 4/1987 | 95/120 |
| JP | 55-27034 | | 2/1980 | |
| JP | 55-19656 | | 5/1980 | |
| JP | 55-97221 | | 7/1980 | |
| JP | 59-092012 | * | 5/1984 | 95/123 |

* cited by examiner

Primary Examiner—Robert H. Spitzer
(74) Attorney, Agent, or Firm—Merchant & Gould P.C.

(57) ABSTRACT

The present invention relates to a gas purification method for adsorbing and removing impurities by PSA method combined with heating, capable of removing water vapor and carbon dioxide in an economical and effective way. The present invention includes an adsorption step of adsorbing and removing water vapor first and then carbon dioxide by introducing the compressed feed gas into the adsorption column; a depressurization step of lowering the internal pressure of the adsorption column down to atmospheric pressure after the adsorption step; a heating step of heating and regenerating an adsorbent by introducing a purge gas not containing the impurities into the adsorption column after the depressurization step; and a repressurization step of elevating pressure by introducing a gas not containing the impurities into the adsorption column after the heating step; wherein the period of time of the adsorption step, the depressurization step plus the heating step and the repressurization step are set to be within the range of 10 to 40 min respectively.

10 Claims, 2 Drawing Sheets

GAS PURIFICATION METHOD

FIELD OF THE INVENTION

The present invention relates to a gas purification method, in particular to a gas purification method capable of purifying feed air by removing water vapor and carbon dioxide contained in the feed air introduced into cryogenic air separation plants.

DESCRIPTION OF THE PRIOR ART

In separating $O_2$, $N_2$ or the like by means of a cryogenic air separation plant the water vapor and the carbon dioxide contained in the feed air are removed before being solidified in the cryogenic section, which is referred to as "pre-purification". Recently, since such an apparatus that can gather $N_2$ as a product with a high ratio and remove carbon dioxide up to the level of 0.1 or less vol. ppm and further excels in operation performance is being demanded, methods for adsorbing and removing water vapor and carbon dioxide by using adsorption columns are widely carried out.

As a pre-purification by an adsorption method, a method of the temperature swing adsorption type(TSA method) in which the adsorption/desorption of the object, component are carried out by temperature difference between adsorption and desorption processes, and a method of the pressure swing adsorption type(PSA method) in which the adsorption/desorption of the object component are carried out by pressure difference between adsorption and desorption processes, are known Compared with PSA method, TSA method has an advantage in that since a smaller amount of regeneration gas may be required, product yield is much higher, although it has a disadvantage that a large amount of heat for heating the regeneration gas is consumed. On the other hand, PSA method, in spite of such a disadvantage that the purge ratio(the ratio of the amount of the regeneration gas to the amount of the purified gas) is relatively high, has merit in that heat for heating is not consumed Therefore, the two respective methods have been used separately according to the operation conditions (primarily, pressure of the feed air) of the cryogenic air separation plants.

In order to carry out the gas purification effectively by such adsorption methods, Japanese patent publication No Sho 55-19656, for example, discloses a method in which heating, together with depressurizing, is carried out to give the amount of heat up to the degree sufficient to complement the heat of desorption during the regeneration step. The method, in which the PSA method is added to the TSA method, could be referred to as PTSA method(Pressure Temperature Swing Adsorption method).

In the above publication, where the example mentions a drying of gas, there is no description about the case where water vapor and carbon dioxide are removed simultaneously and there is no quantitative description for the heating amount.

In addition, the Japanese patent laid-open publication No. Sho 55-97221 discloses the case where the temperature of the supplied purge gas in a regeneration step is set to be at least 10° C. or higher than that of the adsorption step in the first half part and is set to be equal to or lower than that of the adsorption step in the latter half part. An embodiment of the publication discloses that when the operation was carried out under the conditions that the feed air was supplied at 8 atm/10° C. and the purge gas was supplied at 40° C. in temperature elevating condition and at 13° C. in non-temperature elevating condition, the amount of water vapor was 1.5 ppm and the amount of carbon dioxide was 2.5 ppm in the purified air.

In addition, the Japanese patent laid-open publication No. Sho 55-27034 discloses a method using 3 units of adsorption columns, in which one of the adsorption columns is heated and regenerated while the other two units of adsorption columns are used by switching to PSA method, and then successively switched by the above 2 units of the adsorption columns one after another. That is, in order to make the period of time necessary for the heating and regeneration of the adsorption column conform to the switching cycle of the PSA operation, one of the three columns carries out regeneration, with TSA method process while the other two columns are used by switching to PSA method, so that the column returns to the switching cycle of the PSA method at the point of time that the regeneration process with TSA method ends.

The above publications disclose only the concept of the PSA method combined with heating, without description for the degree of heating, its effect, the relations between the adsorbent used and the degree of heating, and the important elements for the embodiment, and thus further study is required to be carried out.

On the other hand, when water vapor and carbon dioxide in feed air are adsorbed and removed in cryogenic air separation plants, the feed air compressed by an air compressor is cooled up to the normal temperature by after-cooler, then further cooled up to 0–10° C. by means of refrigerator using freon or the like and introduced into an absorption column.

With respect to a cooling method of feed air in cryogenic air separation plants, a method of directly cooling the feed air by freon refrigerators is employed in a relatively small apparatus and a method of cooling the feed air by a circulating water circulating a water spray cooling column is employed in a relatively large apparatus. However, even in the case of cooling the feed air by the circulating water, freon refrigerators are frequently used to cool the circulating water.

In recent years, however, due to the tendency of not using freon refrigerators from the view of environmental protection, it is required that the feed air is introduced into an adsorption column without cooling by freon refrigerators. However, without using freon refrigerators, the temperature of the feed air to be supplied into the pre-purification apparatus(adsorption column) becomes the temperature of feed air coming out of an after-cooler(the water temperature plus 5–10° C.), which would be above 40° C. in summer, resulting in that the amount of saturated water vapor contained in the feed air increases in a large amount. For example, the amount of saturated water vapor at 620 KPa, which is a general feed air purification condition, is about 6 times in the case of 40° C. for the air temperature, in contrast to the case of 10° C.

Therefore, when water vapor is adsorbed and removed by a water vapor adsorbent such as an activated alumina, the air temperature which passed through the activated alumina would be around 60° C. due to the adsorption heat generated by the adsorption. For that reason, the amount of carbon dioxide adsorbed by a carbon dioxide adsorbent such as zeolite would decrease up to about ⅓ compared to the case that the adsorption temperature is 10° C. because of the temperature dependency of the amount of adsorption(the reduction of the amount of adsorption in high temperature). Therefore, in order to adsorb and remove the water vapor/carbon dioxide under such a condition, 6 times the amount of activated alumina and 3 times the amount of zeolite would be needed, which, to put it conservatively, results in extreme lowering of economic efficiency.

As a method where water vapor and carbon dioxide are adsorbed and removed adequately with a mere small amount of adsorbent, the time duration of the adsorption process can be shortened, which decreases substantially the amount of water vapor and carbon dioxide which can be introduced into the adsorption column. However, in such a case, if the adsorption/regeneration are performed by TSA method, the time periods allowed for heating to perform the regeneration of the adsorbent or cooling after the heating and regeneration should then be necessarily shortened. Therefore, the regeneration or the cooling of the adsorbent would become insufficient and thus the adsorption and removal of water vapor and carbon dioxide cannot be carried out in many cases. In other words, by merely making the cycle of TSA method short, objective of removing water vapor and carbon dioxide by adsorption method without using freon refrigerators cannot be obtained.

SUMMARY OF THE INVENTION

It is accordingly an object of this invention to provide a gas purification method for adsorbing and removing impurities by using PSA method in combination with heating, whereby the step switching time and the relations between the temperature and the amount of the feed gas to be purified and the purge gas used for heating and regeneration could be adequate, so that water vapor and carbon dioxide could be removed in an economical and effective way.

To achieve the above objects, the present invention provides a gas purification method for obtaining a purified gas by passing feed gas containing water vapor and carbon dioxide as impurities through a plurality of adsorption columns which are packed with an adsorbent adsorbing the impurities and can be used switchably and thus removing the impurities, the method comprising the steps of;

(a) an adsorption step of adsorbing and removing water vapor first and then the carbon dioxide by introducing the compressed feed gas into the adsorption column;

(b) a depressurization step of lowering the internal pressure of the adsorption column down to atmospheric pressure after the adsorption step;

(c) a heating step of heating and regenerating the adsorbent by introducing a purge gas not containing the impurities into the adsorption column after the depressurization step; and (d) a repressurization step of elevating pressure by introducing a gas not containing the impurities into the adsorption column after the heating step;

wherein the respective periods of time of the respective step (a), (b+c) and (d) are set to be within the range of 10 to 40 min.

According to another aspect of the present invention, the temperature of the feed gas is within the range of 30–45° C. in the adsorption step, the amount of the purge gas in the heating step is within the range of 0.2–0.5 relative to the amount of the feed gas in the adsorption step, and the amount of heat supplied to the adsorption column by the purge gas is 0.5 or more relative to the amount of heat supplied by the feed gas to the adsorption column in the adsorption step.

According to another aspect of the present invention, the compressed feed gas is cooled by heat-exchanging with air or coolant water or the compressed feed gas is cooled by being subjected to countercurrent gas-liquid contact with circulating coolant water, prior to being introduced into the absorption column.

According to another aspect of the present invention, the purified gas purified in the adsorption column is cooled to the temperature of 60° C. or lower by heat-exchanging with air or coolant water, or the compressed feed gas and the purge gas are heat-exchanged so that the compressed feed gas is cooled and the purge gas is heated simultaneously.

According to another aspect of the present invention, the feed gas is the feed air of the cryogenic air separation plants and the purge gas is the exhaust gas discharged from the cryogenic air separation plants.

According to another aspect of the present invention, the adsorption column is packed with the water vapor adsorbent at an inlet side of the feed gas thereof and the carbon dioxide adsorbent at an outlet side of the purified gas thereof, and the weight ratio of the water vapor adsorbent to the entire adsorbent is 0.7 or less.

According to another aspect of the present invention, the water vapor adsorbent is one or a combination of two or more types of the adsorbents selected from the group consisting of activated alumina, silica gel, and A type zeolite, and the carbon dioxide adsorbent is zeolite.

BEST MODE FOR CARRYING OUT THE INVENTION

Figure 1:
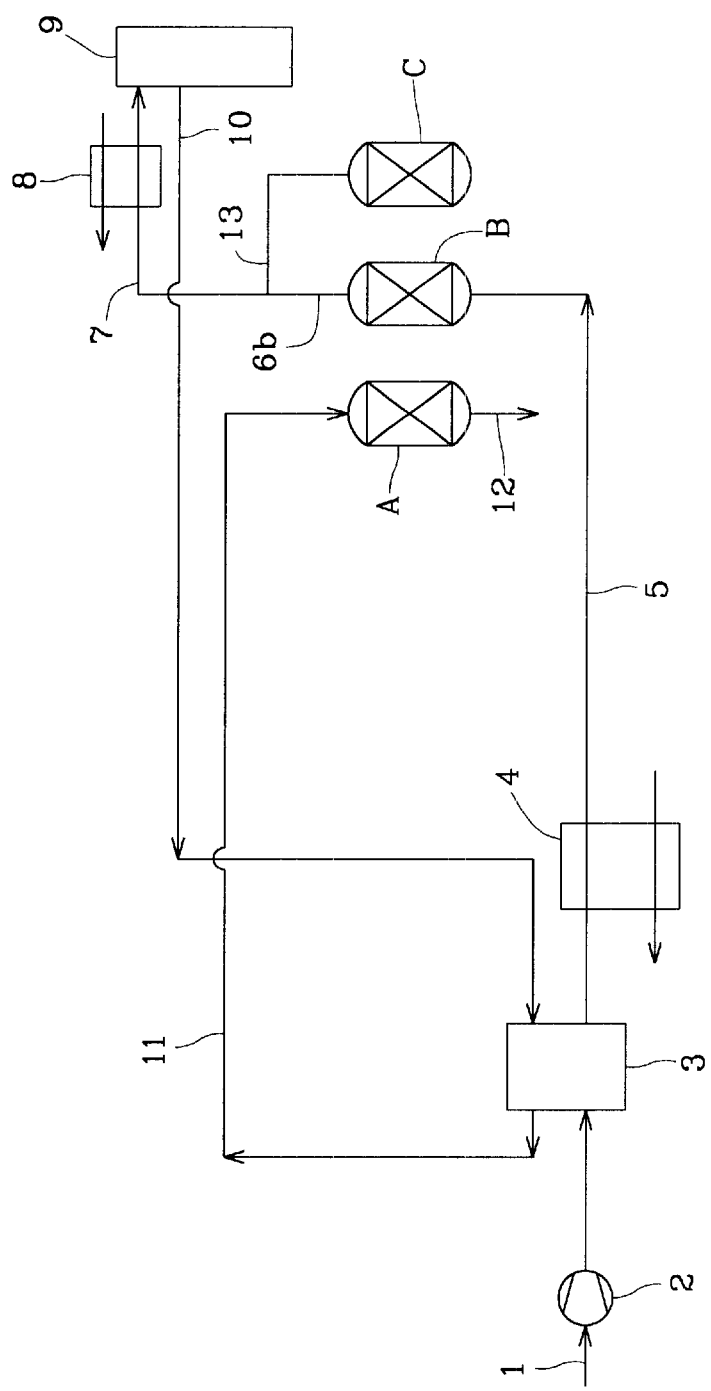
FIG. 1 is a systematic diagram showing a schematic purification apparatus to which the gas purification method according to the present invention is applied.

FIG. 1 is a systematic diagram showing a schematic purification apparatus to which the gas purification method according to the present invention is applied. In addition, the embodiment explains the case where a gas purification apparatus of the three columns switching system using three columns is used as a pre-purification apparatus attached to cryogenic air separation plants.

The feed air introduced from a conduit tube 1 is compressed to the operation pressure required at the cryogenic air separation plants by an air compressor 2 and then flows into an after-cooler 4 through a pre-heater 3 for heating a purge gas. The feed air is cooled to the temperature of 45° C. or lower by heat-exchanging with a coolant water in the after-cooler 4 and the condensed water vapor is drained away. The compressed feed air flowing out from the after-cooler 4 to a conduit tube 5, which is water-saturated at 45° C. or lower, is introduced into an adsorption column B carrying out an adsorption step among three adsorption columns of A, B and C. FIG. 1 shows the state in which an adsorption column A is carrying out a heating step, the adsorption column B is caring out an adsorption step and an adsorption column C is carrying out a repressurization step.

In the respective adsorption columns, a water vapor adsorbent such as an activated alumina or the like is packed at an inlet side of the feed air thereof and a carbon dioxide adsorbent such as zeolite or the like is packed in a rear end thereof. Therefore, the feed air flowing into the adsorption column B in which water vapor is adsorbed and removed in a front portion and carbon dioxide is adsorbed and removed in the rear end, becomes purified air, for example with water vapor content of 1 ppm or less and carbon dioxide content of 0.1 ppm or less, and flows out through a conduit tube 6b of an outlet of the adsorption column The purified air passes from the conduit tube 6b through a conduit tube 7 and a purified gas cooler 8 and is introduced into a cryogenic section 9 of the cryogenic air separation plants.

On the other hand, an exhaust gas which can not be a product from the cryogenic section 9 and discharged into a conduit tube 10 and used as a purge gas, is subjected to heat-exchange with the feed air whose temperature is raised by the compression heat in the pre-heater 3 so that the temperature of the exhaust gas is raised up to the degree necessary for heating the adsorption column to the regeneration temperature. The temperature-raised purge gas flows from a purified gas outlet side of the adsorption column A which is carrying out a heating step, through a conduit tube 11 into an inner side of the column. The purge gas accompanied with the water vapor or the carbon dioxide desorbed from the adsorbent is discharged to the atmosphere from a conduit tube 12 at an inlet side of the feed air and thus the adsorbent in the adsorption column A is regenerated. Any gas could be used as a purge gas for regeneration, but only if the gas does not contain water vapor or carbon dioxide as impurities so that in this regard the exhaust gas of the cryogenic air separation plants may be used. Also, a portion of the purified gaspurified air) discharged from the adsorption column carrying out the adsorption step may be depressurized to be used. In this case, these gases can be used alone or in combination with the other gas.

In addition, in the adsorption column C carrying out the repressurization step, a portion of the purified air discharged from the adsorption column B into the conduit tube 6b is branched off into the conduit tube 13 and then is introduced into the inside of the column from the purified gas outlet side. Thereby, the adsorption column C is repressurized up to the adsorption pressure.

As the adsorbent packed in the respective adsorption columns, water vapor adsorbent such as activated alumina, silica gel, A-type zeolite like molecular sieve 3A, 4A, 5A type, etc., and carbon dioxide adsorbent such as X-type zeolite, molecular sieve 10X, 13X or the like, an adsorbent in which all or a part of the ion-exchangeable cations are replaced by univalent or bivalent metallic cation(s) in the base of the 13X-type zeolite such as Ba.X zeolite or the like, or molecular sieve 5A-type zeolite is preferably used in combination.

In particular, the activated alumina and X-type zeolite are most preferred as the water vapor adsorbent and as the carbon dioxide adsorbent respectively. These adsorbents may be used in combination of two or more components, and any shape such as pellet, tablet, beads or the like may be selected.

In addition, the above various zeolites have an excellent adsorption ability also as a water vapor adsorbent, and thus the above zeolites of various kinds can be adapted as every adsorbent in the adsorption columns. In this case, the zeolite at the inlet side of the feed air functions mainly as a water vapor adsorbent and the zeolite at the outlet side of the purified gas functions mainly as a carbon dioxide adsorbent.

The packing ratio of the water vapor adsorbent and the carbon dioxide adsorbent may be varied with the conditions such as the amount of water vapor or the amount of carbon dioxide, etc. However, in the case of purifying feed air, where the amount of water vapor is generally in a saturated state and the amount of carbon dioxide is 0.03, it is desirable for the weight ratio of water vapor adsorbent to be 0.7 or less relative to the total weight of absorbants. In this case, if the whole quantity of the zeolite, which is used as a carbon dioxide adsorbent, is used al one, the amount of water vapor adsorbent used would become zero in appearance. In other words, as various zeolites which are generally used as a carbon dioxide adsorbent may function as a water vapor adsorbent as well, zeolite can be used as the water vapor adsorbent without using a gents specific to water vapor adsorption separately.

On the other hand, in the case of using a water vapor adsorbent which is hardly capable of adsorbing carbon dioxide, a large amount of such an adsorbent filled results in the shortage of a carbon dioxide adsorbent filled, thereby making it difficult to sufficiently adsorb and remove carbon dioxide. However, among the water vapor adsorbents, activated alumina or molecular sieve 4A, 5A have a relatively high adsorption ability of carbon dioxide, and thus the packing ratio of water vapor adsorbent can be raised up to 0.7 relative to the total amount of adsorbents.

Each of the above described steps is stopped at the point of time when a pre-determined period of time is passed before the adsorbents are saturated with water vapor or carbon dioxide, and the adsorption column A is switched to the repressurization step, the adsorption column B is switched to the heating step from the depressurization step and the adsorption column C is switched to the adsorption step. As shown in the table 1, by automatically opening and closing the respective switching valves attached to the respective adsorption columns in a predetermined order, and by operating out of phase the respective steps for the respective adsorption columns, the purification of the feed air is continuously performed.

TABLE 1

|  | Step 1 | Step 2 | Step 3 |
| --- | --- | --- | --- |
| Adsorption column A | Adsorption | Depressurization Heating | Repressurization |
| Adsorption column B | Repressurization | Adsorption | Depressurization Heating |
| Adsorption column C | Depressurization Heating | Repressurization | Adsorption |

The switching time of the steps 1 to 3 in Table 1, that is, the time for the adsorption step, the time for depressurization and heating step and the time for repressurization step are preferably within a range of 10 to 40 min, more preferably within a range of 15 to 25 min.

This step switching time is shorter than that of the conventional PSA method combined with heating. By operating the step in such a short cycle, the load of water vapor/carbon dioxide flowing into the adsorption column during one time of an adsorption step may be reduced, thereby capable of decreasing the amount of adsorbents necessary for the adsorption and removal thereof.

On the other hand, in the case where the step switching time is less than 10 min, the repressurization loss by adsorption column switching (unusable gases present in a void and the like) rises, thereby making an economical operation impossible, and in the case where the step switching time is too long, the amount of the object materials to be removed which are introduced into the adsorption column rises so that more adsorbents become required and the amount desorbed by only depressurizing is limited, and thus the ratio of the desorbed amount to the adsorbed amount is reduced, thereby making sufficient regeneration impossible.

In addition, the heating step is supposed to be stopped at the point of time that the middle part of the column is heated, without heating all the adsorbent in the adsorption column. That is, as described above, by filling a water vapor adsorbent at the inlet side of the feed gas and a carbon dioxide adsorbent in the rear end, the water vapor adsorbent is regenerated to some extent due to the depressurization in the depressurization step after the respective adsorption step, and regenerated again by the gas which is introduced from the outlet of the column in the heating step to regenerate carbon dioxide adsorbent and then passes the portion of the water vapor adsorbent.

In particular, as the temperature of the gas flowing from the portion of the carbon dioxide adsorbent in the adsorption step is already elevated up to 60° C. or higher by the adsorption heat of the water vapor from the water vapor adsorbent, the temperature of the gas flowing from the carbon dioxide adsorbent to the water vapor adsorbent during the depressurization step and the heating step is relatively high. Therefore, by shortening the step switching time and setting the amount of water vapor introduced into the adsorption column below a certain degree, it could be possible to regenerate water vapor adsorbent sufficiently without heating the water vapor adsorbent in the heating step.

Further, contrary to the conventional manner where a cooling step is carried out for a long time after a heating step for cooling the adsorbent to the temperature of the feed air cooled in freon refrigerators, the temperature of tie feed air To be purified is relatively high and the amount of impurities to be removed is small due to the shortened switching time, such that the impurities may be sufficiently adsorbed and removed at a relatively high temperature compared to the conventional way, thereby being capable of omitting the cooling step after the heating step. Therefore, the heat added to the middle part of the column in the heating step stays inside the column due to the closed exit of the gas in the repressurization step. By adequately setting the temperature of the feed air flowing into the column in the adsorption step, the internal temperature of the column may be maintained within a pre-determined range and thus the pre-determined adsorption operation can be carried out.

That is, the temperature of the coldest part of the adsorbent layer is dependent on the temperature of the feed gas (feed air) introduced into the adsorption column in most cases, which goes relatively high if the temperature of the feed gas is high, and goes relatively low if the temperature of the feed gas is low. In the case of purifying the feed air higher than 45° C., the temperature of the adsorbent is elevated. Therefore, an extremely large amount of adsorbent becomes required because of the temperature dependency of the adsorption amount of the adsorbent and the amount of purge gas needed for regenerating the adsorbent becomes increased as well. On the other hand, in the case where the introduction temperature of the feed air is too low, for example lower than 30° C., the temperature of the adsorbent packed at the inlet side of the adsorption column becomes lowered and the water vapor adsorption amount of the part is increased. Therefore, for sufficient regeneration, the regeneration needs to be carried out in high temperature and a large amount of a purge gas needs to be used and the time for regeneration needs to be long.

Therefore, in order to carry out the adsorption and regeneration effectively by the step switching in a short period of time as described above, it is preferred to set the temperature of the feed air introduced into the adsorption column within the range of 30–45° C., in the case of purifying the feed gas of the cryogenic air separation plants.

Further, the regeneration of the adsorbent is carried out by depressurizing from the adsorption pressure to atmospheric pressure in the depressurization step and by a heating-purge in the heating step. The amount of the purge gas used in the heating purge is preferably set to be within the range of 0.2–0.5 relative to the amount of the feed air, and the ratio of the amount of the heat supplied to the adsorption column by the purge gas in the heating step with respect to the amount of the heat supplied to the adsorption column by the feed air in the adsorption step is preferably set to be 0.5 or more.

Such relations, which are obtained by experience, are stated as follows:

the amount of heating by purge gas×the temperature of the heating-purge gas[° C.]÷(the amount of heating by feed gas×the temperature of the feed gas[° C.])≧0.5

In the case where the amount of the purge gas is 0.2 or less relative to the amount of the feed gas, the ratio of the heated adsorbent is small even if the temperature of the heated gas is set to be high, and thus adequate desorption of water vapor or carbon dioxide, namely the regeneration of the adsorbent cannot be appropriately carried out On the other hand, in the case where the amount of purge gas is large, namely the purge ratio is high, though there is no problem in the regeneration of the adsorbent, the product yield as a cryogenic air separation plants is lowered and thus the economical efficiency of the whole apparatus is decreased.

Further, for an effective purge-regeneration of the heating step, the heating temperature of the purge gas needs to be raised if the amount of the purge gas is small and the heating temperature of the purge gas can be lowered if the amount of the purge gas may be made large. However, it is desirable to set the above relations so that the ratio of the heat amount introduced into the adsorption column by the purge gas in the heating step is at least 0.5 relative to the heat amount introduced into the adsorption column by the feed air in the adsorption step.

In other words, if the heat amount supplied by the purge gas is less than 0.5 relative to the heat amount supplied by the feed air, the regeneration cannot be sufficiently carried out.

In addition, though a general heating device such as an electric heater can be used for heating the purge gas, by heat-exchanging the purge gas and the feed air heated by the compression heat in the pre-heater 3 arranged at the outlet side of the compressor and thus using the compression heat effectively, the temperature of the purge gas can be raised up to the adequate degree and simultaneously the feed gas can be cooled within the above described range of 30–45° C., resulting in the elevating of the temperature of the purge gas and the cooling of the feed gas being economically accomplished. Further, if the temperature of the purge gas cannot be elevated enough in the pre-heater 3, it is desirable to provide the conduit tube 1 with an adequate heater.

In addition, a temperature controlling means for setting the temperature of the feed air within the above described range can be provided in the system for introducing the feed air into the purification apparatus. As this temperature controlling means, for example, a thermometer can be provided in the pathway of the inlet of the adsorption column, wherein a part of the feed gas may be made to bypass cooling means such as a cooler or a pre-heater, so that the temperature measured by the thermometer is to be the established value. In addition, as the means for cooling the feed air heated by the compression heat, there are a feed air cooler for cooling the feed air by using air or coolant water as a cooling source, a water spray cooling column for cooling the feed air by subjecting the circulating cooling water and the compressed feed air to gas-liquid contact, and a purge gas pre-heater in which a feed air pathway is set to be a heat-exchanging pathway and a purge gas pathway is set to be the other heat-exchanging pathway.

On the other hand, as for the purified air which comes out of the adsorption column, its temperature is elevated up to the degree of 60° C. or higher, mainly by the adsorption heat of water vapor. Therefore, by cooling it up to the degree of 60° C. or lower, more preferably 40° C. or lower, in the purified gas cooler 8 or the like, the heat load to the low-temperature part of the cryogenic air separation plants can be reduced.

Further, the pressure of the feed air introduced into the purification apparatus (adsorption column) is preferably 0.5 MPa or higher. If the introduction pressure of the feed air becomes low, the water vapor content increases according to the lowering of the pressure of the feed air and thus the load to be adsorbed and removed increases, too, resulting in that a larger amount of adsorbent should be required. Moreover, since the difference between the adsorption pressure and the regeneration pressure in the PSA method becomes small, the change of the amount of adsorption by the change of pressure becomes small so that the regeneration efficiency by depressurizing become decreased, resulting in desorption and regeneration becoming difficult. On the contrary, as the upper limit of pressure is limited by the ability of the compressor or the pressure resistance of the respective part of the cryogenic air separation plants, the upper limit of the purification apparatus is not defined particularly.

In addition, the respective conditions as described above, represent the desirable range of conditions in the case of removing water vapor and carbon dioxide contained in the feed air of cryogenic air separation plants. For the purpose of adsorbing and removing water vapor and carbon dioxide present in the gas to be purified (the feed gas), it can be adapted to the purification of various gases and the optimum operation condition can be properly established corresponding to the conditions such as the amount of impurities in the feed gas and the gathering ratio of the purified gas.

Figure 2:
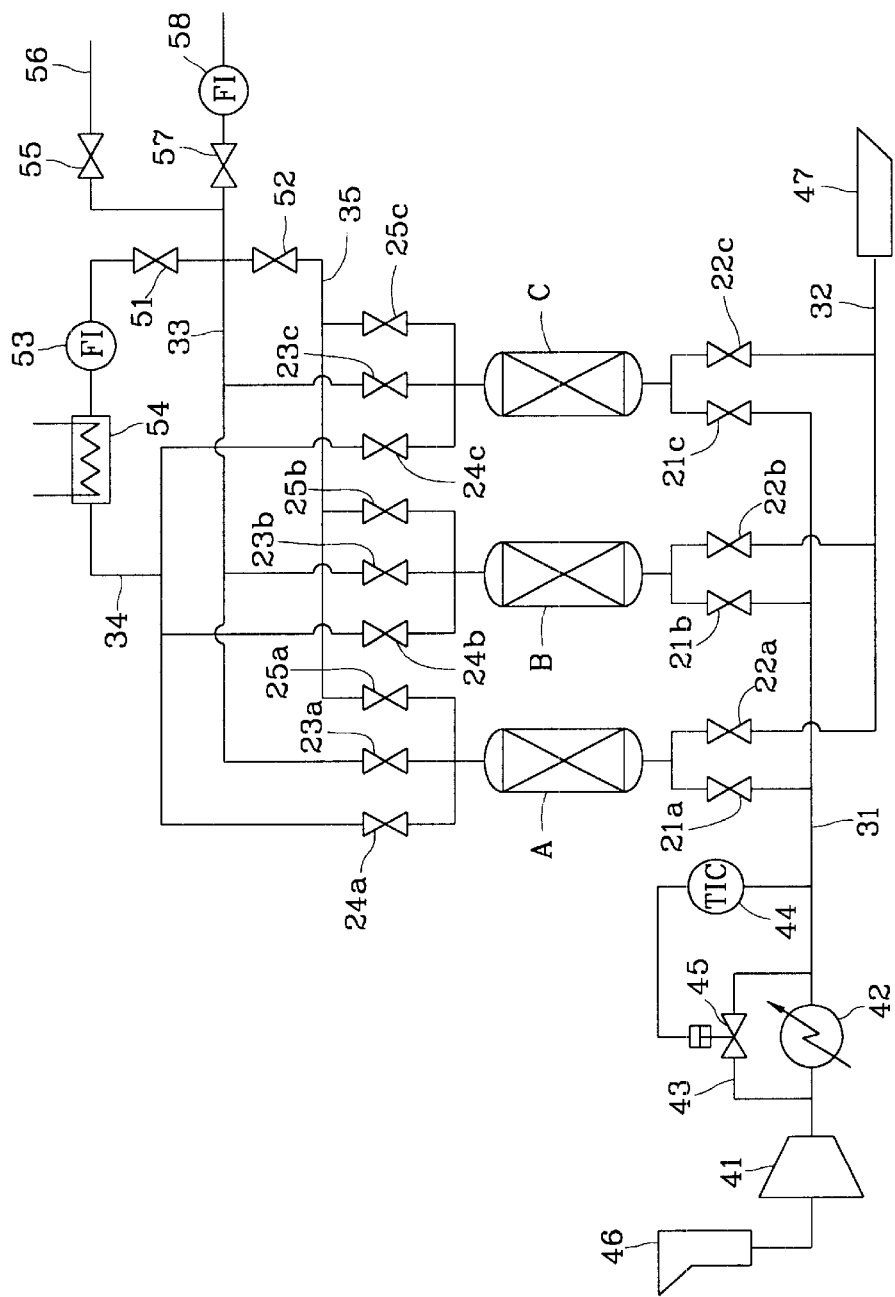
FIG. 2 is a systematic diagram of the gas purification apparatus used in the embodiment according to the present invention.

Using the purification apparatus shown in FIG. 2 as the pre-purification apparatus of the cryogenic air separation plant, an experiment for removing water vapor and carbon dioxide present in the feed air was carried out. In the purification apparatus, the three absorption columns of A, B and C are provided switchably. In the respective adsorption columns, beads-shaped activated aluminas of 2–3 mm in particle size were packed at the inlet side thereof and beads-shaped zeolites 13X of 1–3mm in particle size were packed in the rear end thereof (outlet side). At the inlet sides of the respective adsorption columns, feed gas inlet valves 21a, 21b, 21c and discharge valves 22a, 22b, 22c are provided, which are connected with a feed gas(feed air) introduction pathway 31 and a purge gas discharging pathway 32 respectively. At the outlet sides of the respective adsorption columns, purified air outlet valves 23a, 23b, 23c, purge valves 24a, 24b, 24c and repressuring valves 25a, 25b, 25c are provided, which are connected with a purified gas (purified air) discharging pathway 33, a purge gas introduction pathway 34 and a repressurizing gas introduction pathway 35 respectively.

In an after-cooler 42 arranged in the rear end of a feed air compressor 41 for compressing the feed air, a bypass pathway 43 which bypasses the after-cooler 42 is provided, and a temperature indication regulator 44 as the temperature controlling means and a bypass valve 45 are provided for controlling the bypass amount by measuring the temperature of the feed air flowing out of the after-cooler 42. In addition, a filter 46 is provided in an atmospheric air introduction opening of the feed air compressor 41, and a muffler 47 is provided in the end of the purge gas discharging pathway 32.

The purge gas introduction pathway 34 and the repressurizing gas introduction pathway 35 are divided through valves 51, 52 from the purified air discharging pathway 33 and formed so that the pressure and the flow amount can be controlled. In addition, a flow meter 53 and a heater 54 are provided in the purge gas introduction pathway 34. Most of the purified air is discharged through a valve 57 and a flow meter 58, except that a part of the air branches off through an analysis valve 55 to an analysis pathway 56.

In operating the purification apparatus, similar to the above, the purification of the feed air is successively carried out by opening and closing the respective valves based on the pre-determined sequence. For example, when the adsorption column A is in the regeneration step(from depressurization step to heating step), the adsorption column B is in the adsorption step and the adsorption column C is in the repressurization step, the feed air compressed in the feed air compressor 41 is regulated to the pre-determined temperature by controlling an after-cooler bypass amount through the temperature controlling means and then flows from the feed air introduction pathway 31 through the feed air inlet valve 21b into the adsorption column B, in a water vapor-saturated state in the temperature. The purified air in the adsorption column B flows from the purified air outlet valve 23b into the purified air discharging pathway 33 and a part of it branches off into the purge gas introduction pathway 34 and the repressurztng gas introduction pathway 35, and then used as a purge gas and a repressurizing gas.

In the adsorption column A, at first the depressurization step to discharge the gas in the column from the discharge valve 22a to the purge gas discharging pathway 32 is carried out, and then the heating step, in which the purified air branched off into the purge gas introduction pathway 34 is heated by heater 54 to the predetermined temperature and introduced into the adsorption column A through the purge valve 24a, is performed. In the adsorption column C, the purified air branched off into the repressurizing gas introduction pathway 35 is introduced into the adsorption column C through the repressurizing valve 25c.

By using and operating the purification apparatus formed as above, in which the amount of the feed air, the pressure of the feed air, the regenerating pressure and the step switching time are fixed to 1500N m'/h, 0.8 MPa, atmospheric pressure and 20 min respectively, and in which the temperatures of the feed air flowing into the adsorption column(air temperature [° C.]), the amounts of the purge gas to the amount of the feed air(the ratio of the purge gas), the temperatures of the purge gas(heating temperature [° C.]) and the weight ratio of the activated alumina to the total amount of the adsorbents packed in the adsorption columns were established as shown in the experiment number 1–10 of the Table 2, the amounts of the water vapor and carbon dioxide present in the purified gas were measured. The table 2 represents the results.

TABLE 2

| Experiment no. | Air temperature | The ratio of the purge gas | Heating temperature | The weight ratio of the activated alumina | The measured result [ppm] | |
|---|---|---|---|---|---|---|
| | | | | | Water vapor | Carbon dioxide |
| 1 | 35 | 0.3 | 70 | 0.25 | ≦0.1 | ≦0.1 |
| 2 | 35 | 0.3 | 70 | 0.70 | ≦0.1 | ≦0.1 |
| 3 | 35 | 0.3 | 60 | 0.00 | ≦0.1 | ≦0.1 |
| 4 | 45 | 0.5 | 50 | 0.40 | ≦0.1 | ≦0.1 |
| 5 | 50 | 0.6 | 85 | 0.25 | ≦0.1 | ≦1 |
| 6 | 25 | 0.3 | 80 | 0.25 | — | Breakthrough |
| 7 | 50 | 0.3 | 100 | 0.25 | — | Breakthrough |
| 8 | 35 | 0.15 | 100 | 0.25 | — | Breakthrough |
| 9 | 35 | 0.3 | 50 | 0.25 | — | Breakthrough |
| 10 | 35 | 0.3 | 60 | 0.80 | — | Breakthrough |

As shown in the Table 2, among the experiments assuming the purification of the feed gas of the cryogenic air separation plants, the regeneration could not be sufficiently carried out because of the low temperature of the air in experiment No. 6, the adsorption and removal could not be sufficiently carried out because of the high temperature of the air in experiment No. 7, the heating and regeneration could not be sufficiently carried out because of the low ratio of the purge gas in experiment No. 8, the heating and regeneration could not be sufficiently carried out because the heat amount supplied by the purge gas became small in contrast to the heat amount supplied to the feed air due to the low heating temperature in experiment No.9, and the packing amount of zeolite 13X which was a carbon dioxide adsorbent was small in experiment No. 10, and thus the amount of carbon dioxide in the purified air exceeded 1 ppm in any cases, causing the adsorbent to be in a state of breakthrough to the carbon dioxide.

As described above, the present invention is capable of removing water vapor and carbon dioxide in the feed gas in a high level, by merely cooling the compressed feed gas using after-cooler by water-cooling or by air-cooling, without using a particular apparatus such as freon refrigerators or water spray cooling columns. In addition, the size of the adsorption column can be minimized due to the shortened switching time and the gas purification can be economically carried out by optimizing the amount of the purge gas and the heating degree. In particular, it is most suitable as a purification apparatus for pre-purification for purifying the feed air of a cryogenic air separation plants.

What is claimed is:

1. A gas purification method for obtaining a purified gas by passing a feed gas containing water vapor and carbon dioxide as impurities through a plurality of adsorption columns which are packed with an adsorbent adsorbing the impurities and can be used switchably, and thus removing the impurities, the method comprising the steps of:
   (a) an adsorption step of adsorbing and removing the water vapor first and then the carbon dioxide by introducing compressed said feed gas into the adsorption columns, said feed gas in the adsorption step being introduce into the adsorption columns at a temperature within a range of 30° C. through 45° C.;
   (b) a depressurization step of lowering internal pressure of the adsorption columns down to atmospheric pressure after the adsorption step;
   (c) a heating step of heating and regenerating the adsorbent by introducing a purge gas not containing the impurities into the adsorption columns after the depressurization step, said purge gas supplying heat to the adsorption columns in the heating step of 0.5 or more relative to heat supplied to the adsorption columns by the feed gas in the adsorption step; and
   (d) without cooling after the heating step, a repressurization step of elevating pressure by introducing a gas not containing the impurities into the adsorption column;
   wherein the respective periods of time of the respective steps (a), (b+c) and (d) are each set to be within the range of 15 to 25 min.

2. The gas purification method according to claim 1, wherein the amount of the purge gas in the heating step is within a range of 0.2 to 0.5 relative to the amount of the feed gas in the adsorption step.

3. The gas purification method according to claim 1, wherein the compressed feed gas is cooled by heat-exchanging with air or coolant water, prior to being introduced into the adsorption column.

4. The gas purification method according to claim 1, wherein the compressed feed gas is cooled by being subjected to countercurrent feed gas-water contact with circulating coolant water, prior to being introduced into the adsorption column.

5. The gas purification method according to claim 1, wherein the purified gas purified in the adsorption column is cooled to the temperature of 60° C. or lower by heat-exchanging with air or coolant water.

6. The gas purification method according to claim 1, wherein the compressed feed gas and the purge gas are heat exchanged so that the compressed feed gas is cooled and the purge gas is heated.

7. The gas purification method according to claim 1, wherein the feed gas is a feed air of a cryogenic air separation plants, and the purge gas is an exhaust gas discharged from the cryogenic air separation plants.

8. The gas purification method according to claim 1, wherein the adsorption column is packed with the water vapor adsorbent at an inlet side of the feed gas thereof and with the carbon dioxide adsorbent at an outlet side of the purified gas thereof, and the weight ratio of the water vapor adsorbent to the total adsorbent is 0.7 or less.

9. The gas purification method according to claim 1, wherein the water vapor adsorbent is one or a combination of two or more types of adsorbents selected from a group consisting of activated alumina, silica gel and zeolite A.

10. The gas purification method according to claim 1, wherein the carbon dioxide adsorbent is zeolite.

* * * * *